US007334774B1

(12) United States Patent
Lin

(10) Patent No.: US 7,334,774 B1
(45) Date of Patent: Feb. 26, 2008

(54) EXTENSIBLE AND TURNOVER HANDLE STRUCTURE FOR A JACK

(76) Inventor: Vincent W. Lin, No. 365, Chuei Yang Rd., Chiayi City (TW)

( * ) Notice: Subject to any disclaimer, the term of this patent is extended or adjusted under 35 U.S.C. 154(b) by 0 days.

(21) Appl. No.: 11/623,940

(22) Filed: Jan. 17, 2007

(51) Int. Cl.
*B60P 1/48* (2006.01)

(52) U.S. Cl. ......................... 254/8 B; 254/2 B; 74/544

(58) Field of Classification Search ................ 254/8 B, 254/2 B, 93 R, 2 C; 74/544; 16/429, 115
See application file for complete search history.

(56) References Cited

U.S. PATENT DOCUMENTS 3,338,607 A * 8/1967 Broadhurst, Jr. ............ 403/342
4,793,646 A * 12/1988 Michaud, Jr. .............. 294/19.1
5,381,707 A * 1/1995 Gill ............................. 74/546
6,546,596 B2 * 4/2003 Grote et al. .................. 16/429
6,986,503 B2 * 1/2006 Arzouman .................. 254/8 B
2003/0015057 A1 * 1/2003 Berdan et al. ................ 74/544

* cited by examiner

*Primary Examiner*—Lee D. Wilson
(74) *Attorney, Agent, or Firm*—Alan Kamrath; Kamrath & Associates PA

(57) ABSTRACT

An extensible and turnover handle structure for a jack comprises a pivot ear formed at the front end of a base. The pivot ear is provided for a pivot connection with the handle. Moreover, the handle includes an inner pipe inserted in an outer pipe and serves to draw out the inner pipe in use, thus elongating an arm of force relative to the base, and the handle can be turned to a position above a top plate to reduce volume during storage.

3 Claims, 5 Drawing Sheets

EXTENSIBLE AND TURNOVER HANDLE STRUCTURE FOR A JACK

BACKGROUND OF THE INVENTION

1. Field of the Invention

The present invention relates to an extensible and turnover handle structure for a jack. Essentially, a base provided for a pivot connection with a handle is formed with a pivot ear on the front end thereof, the handle includes an inner pipe inserted in an outer pipe, at a bottom of the inner pipe is located an elastic locking-pin to be engaged in a locking hole in a top end of an inner surface of the outer pipe. In such a manner, the inner pipe can be drawn out to elongate an arm of force relative to the base, thus achieving an objective of saving energy, and the handle can be turned to a position above a top plate to reduce the jack volume during storage, thus facilitating storage and occupying little space.

2. Description of the Prior Art

A jack is specially used to lift a heavy, and it is widely applied in various industries in virtue of traits of easy transportation and convenient operation; especially for vehicle maintenance, it is a necessary tool. Thus almost every vehicle is prepared with a jack for a rainy day.

An operation of the jack is mainly to utilize a handle to drive a base to swing up and down to draw hydraulic oil that is provided for an oil cylinder to boost, thus a top plate can achieve a lifting power to lift the heavy. So during an operational process, an arm of force is just the handle operated by the user. However, due to limits of the transportation and storage, the length of the handle must be limited, so the handle cannot be too long. As a result, rotating a short arm of force usually requires a lot of physical strength. And the handle of the conventional jack is directly locked on the base, extending backwards and airwards at an angle, so when the jack is not in use, the user sometimes has to take down the handle to reduce storage space, and then has to assemble it again when wanting to use it.

The present invention has arisen to mitigate and/or obviate the afore-described disadvantages.

SUMMARY OF THE INVENTION

The present invention relates to an extensible and turnover handle structure for a jack. Essentially, a base provided for a pivot connection with a handle is formed with a pivot ear on the front end thereof; the handle includes an inner pipe inserted in an outer pipe, so that it can provide the following efficiency during the operation:

1. Since the handle of the present invention includes the inner pipe inserted in the outer pipe, the inner pipe can be drawn out of the outer pipe, thus greatly increasing an arm of force provided by the handle, so that it will be more convenience and easier to control the base to draw the hydraulic oil, and an objective of saving energy can be achieved.

2. The handle of the present invention is pivotally coupled to the base by a handle seat, and the pivot ear formed on the front end of the base is provided for a pivot connection with the handle seat. After the pivot connection, the handle seat can freely swing with respect to the base, so that the handle can be turned to a position above a top plate, thus reducing the jack volume. Therefore, the jack can be easily stored and a problem of the storage space can be solved.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
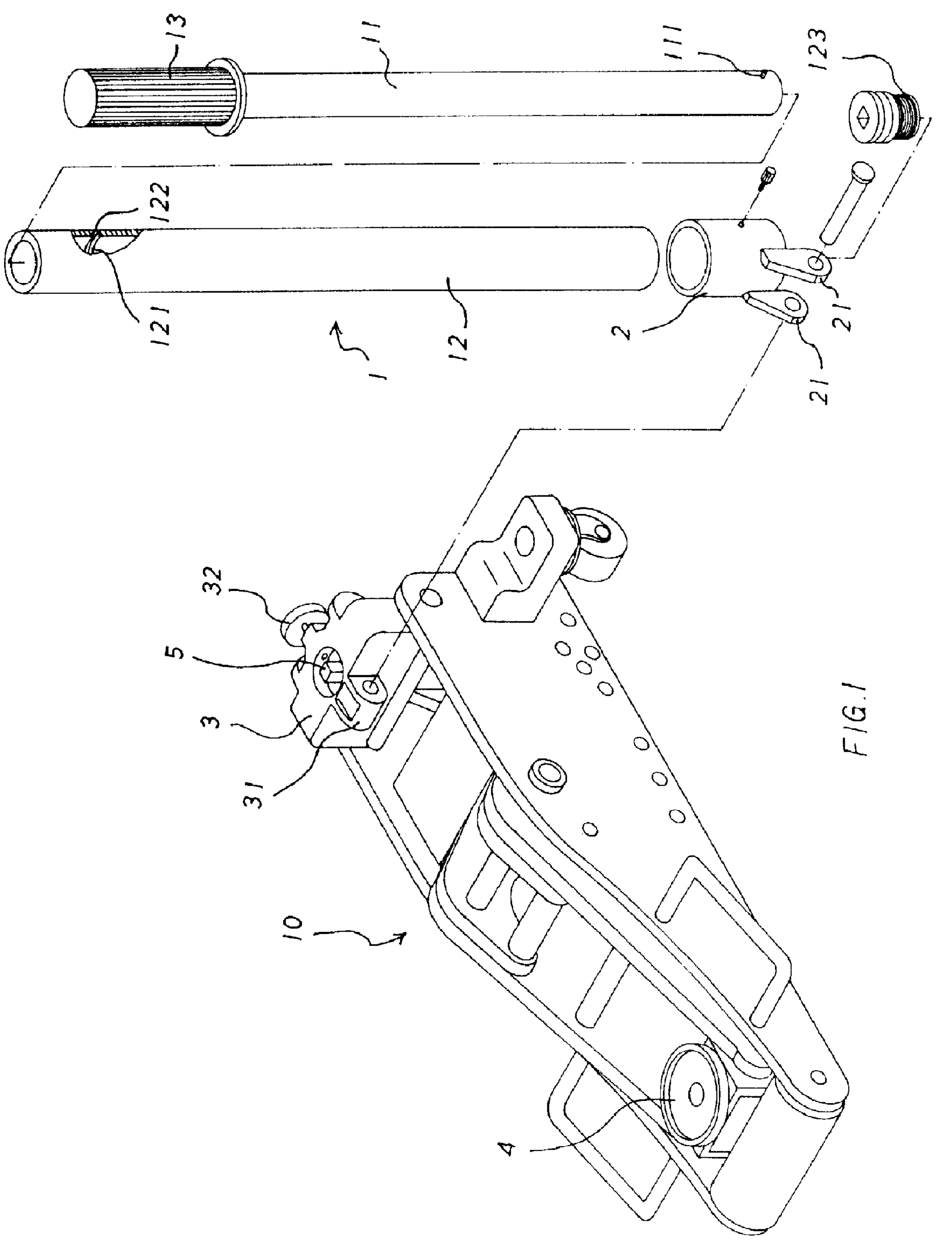
FIG. 1 is an exploded view of a jack in accordance with the prevent invention.

An extensible and turnover handle structure for a jack in accordance with the present invention essentially comprises a handle 1, a handle seat 2 and a base 3 (as shown in FIG. 1).

Figure 2:
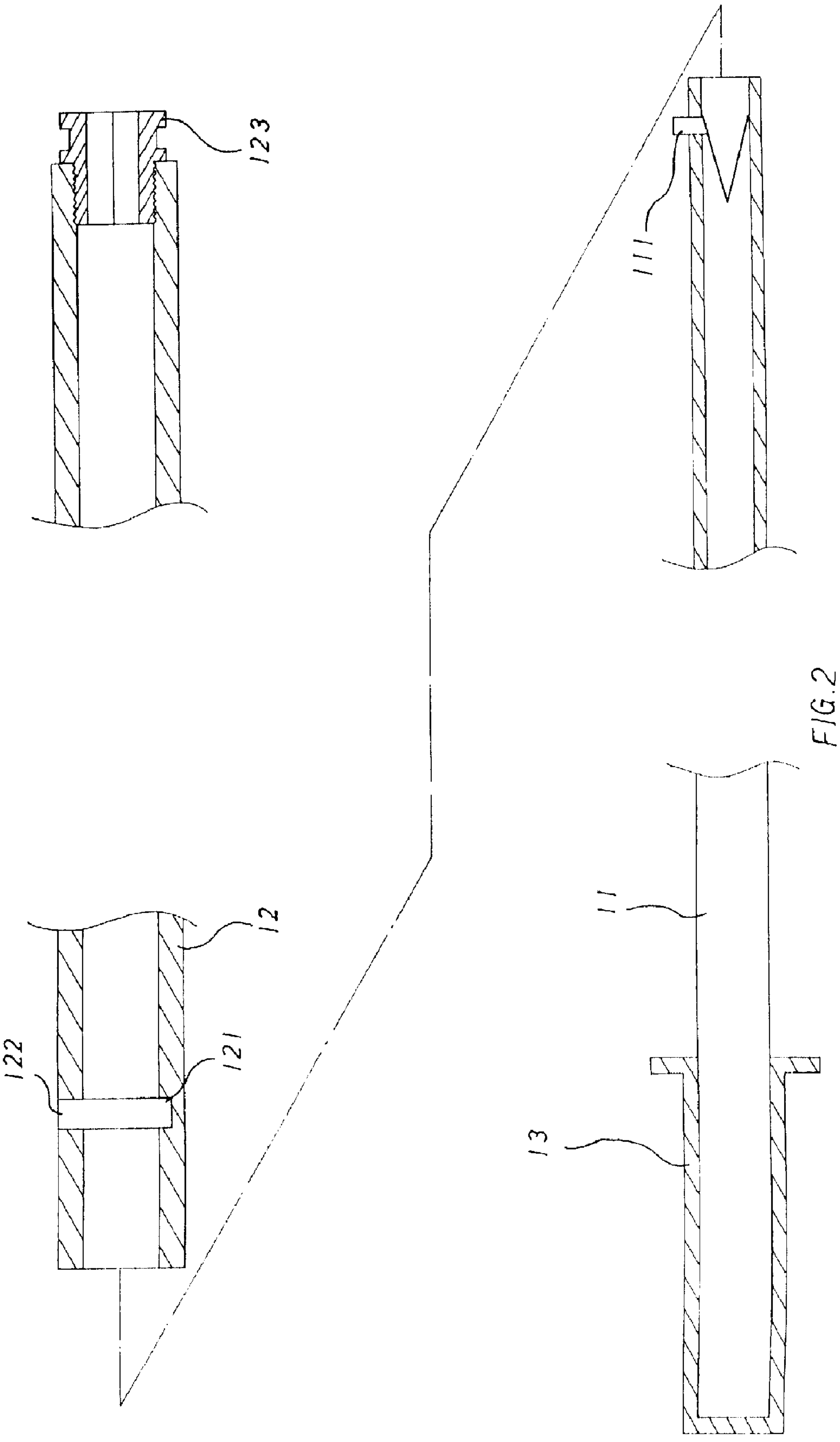
FIG. 2 is a cross sectional view of a handle of the jack in accordance with the prevent invention.

The handle 1 includes an inner pipe 11 inserted in an outer pipe 12, at a bottom of the inner pipe 11 is located an elastic locking-pin 111 to be engaged in a locking hole 122 in a concave ring 121 formed in a top end of an inner surface of the outer pipe 12 (as shown in FIG. 2).

The handle seat 2 is a seat that receives and locks the outer pipe 12, and a pair of ears 21 extends downward from a front surface of a bottom of the handle seat 2.

The base 3 is a swing member serving to draw hydraulic oil through swing motion and is formed at a front end thereof with a pivot ear 31.

Figure 3:
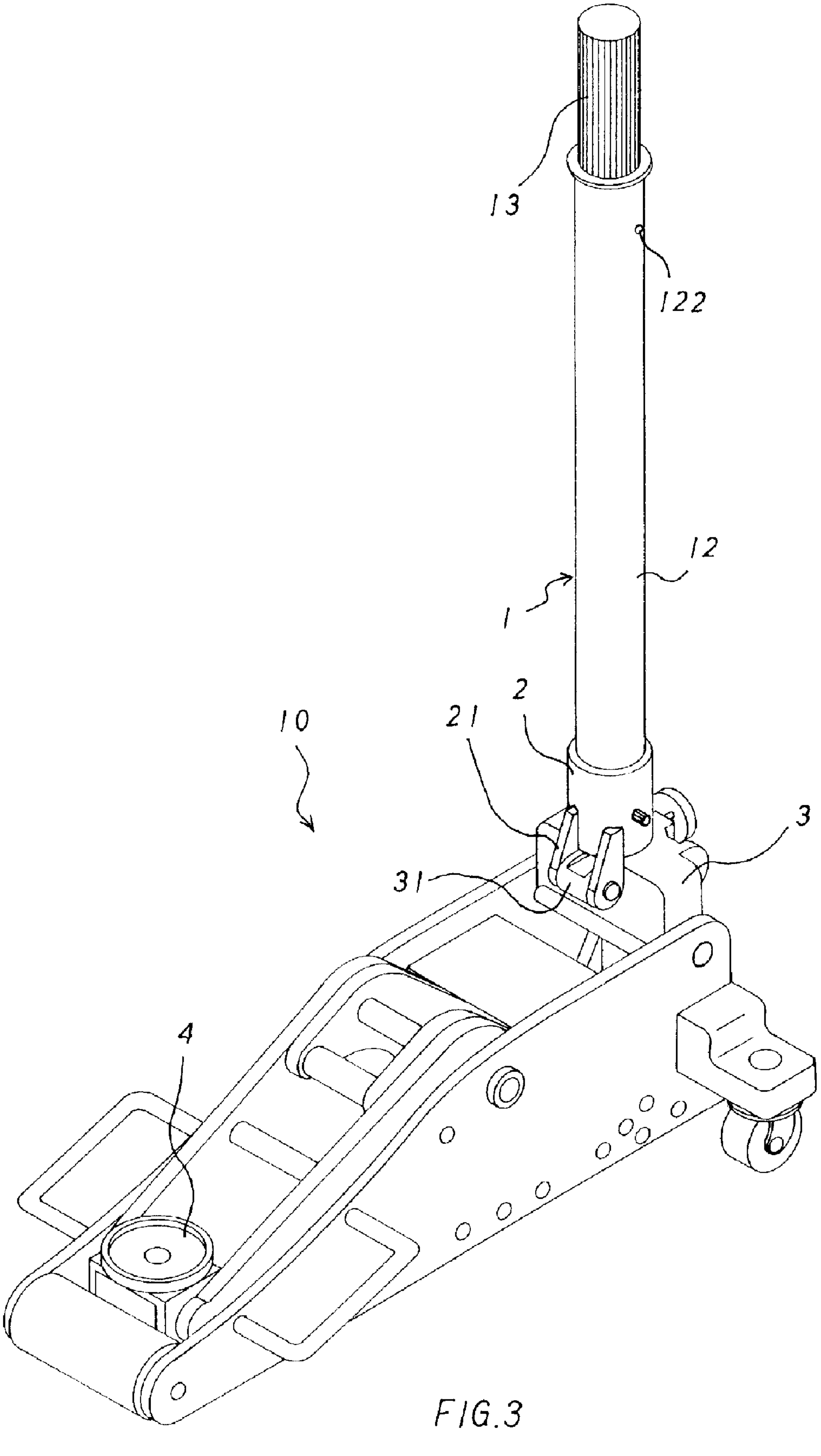
FIG. 3 is a perspective view of the jack in accordance with the prevent invention.

The two ears 21 of the handle seat 2 are pivotally coupled to the pivot ear 31 of the base 3, the outer pipe 12 is inserted in the handle seat 2, and then the inner pipe 11 with a handle sleeve 13 on a top end thereof is inserted in the outer pipe 12 (as shown in FIG. 3).

Figure 4:
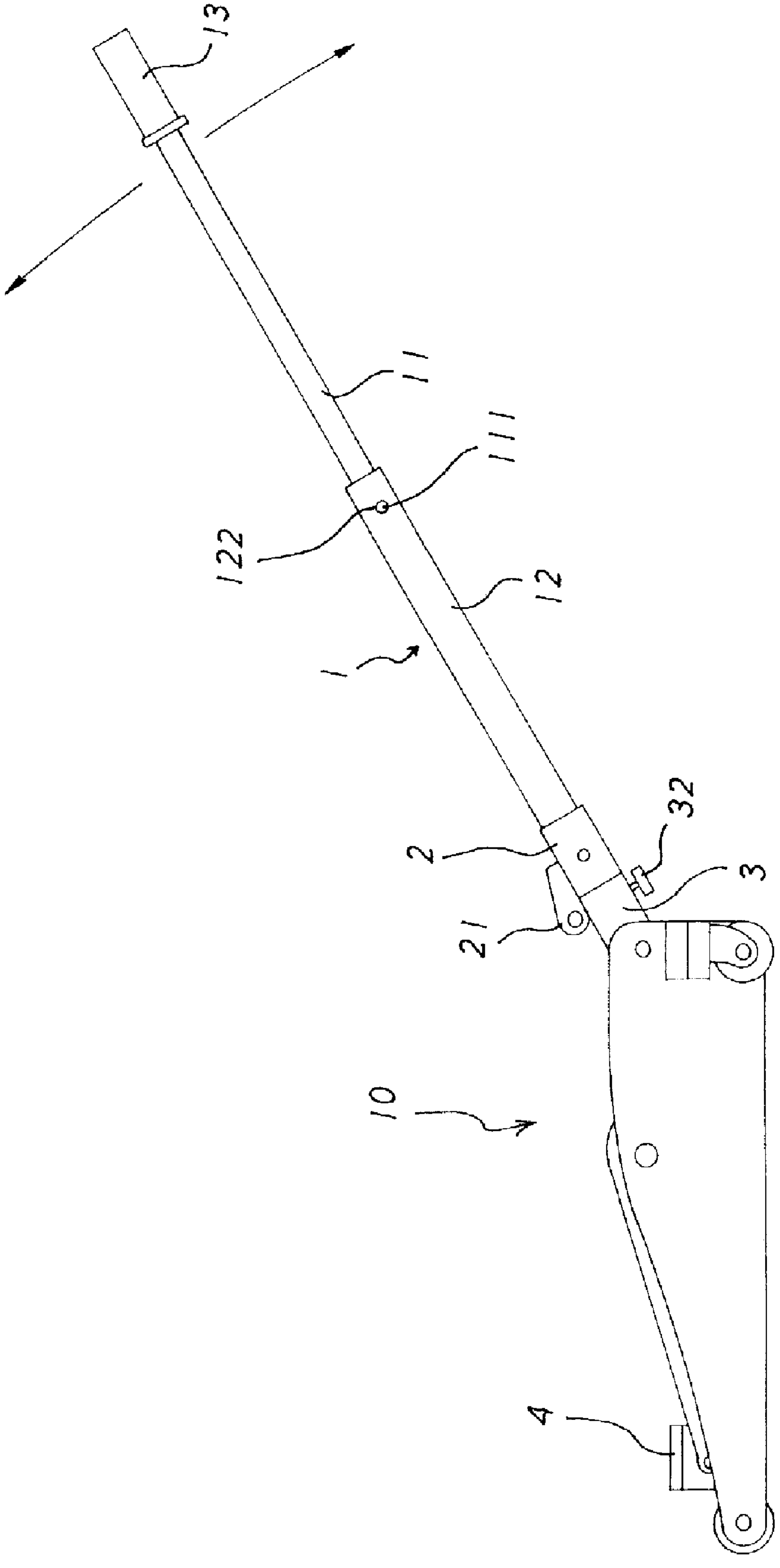
FIG. 4 is an operational view of the jack in accordance with the prevent invention.
Figure 5:
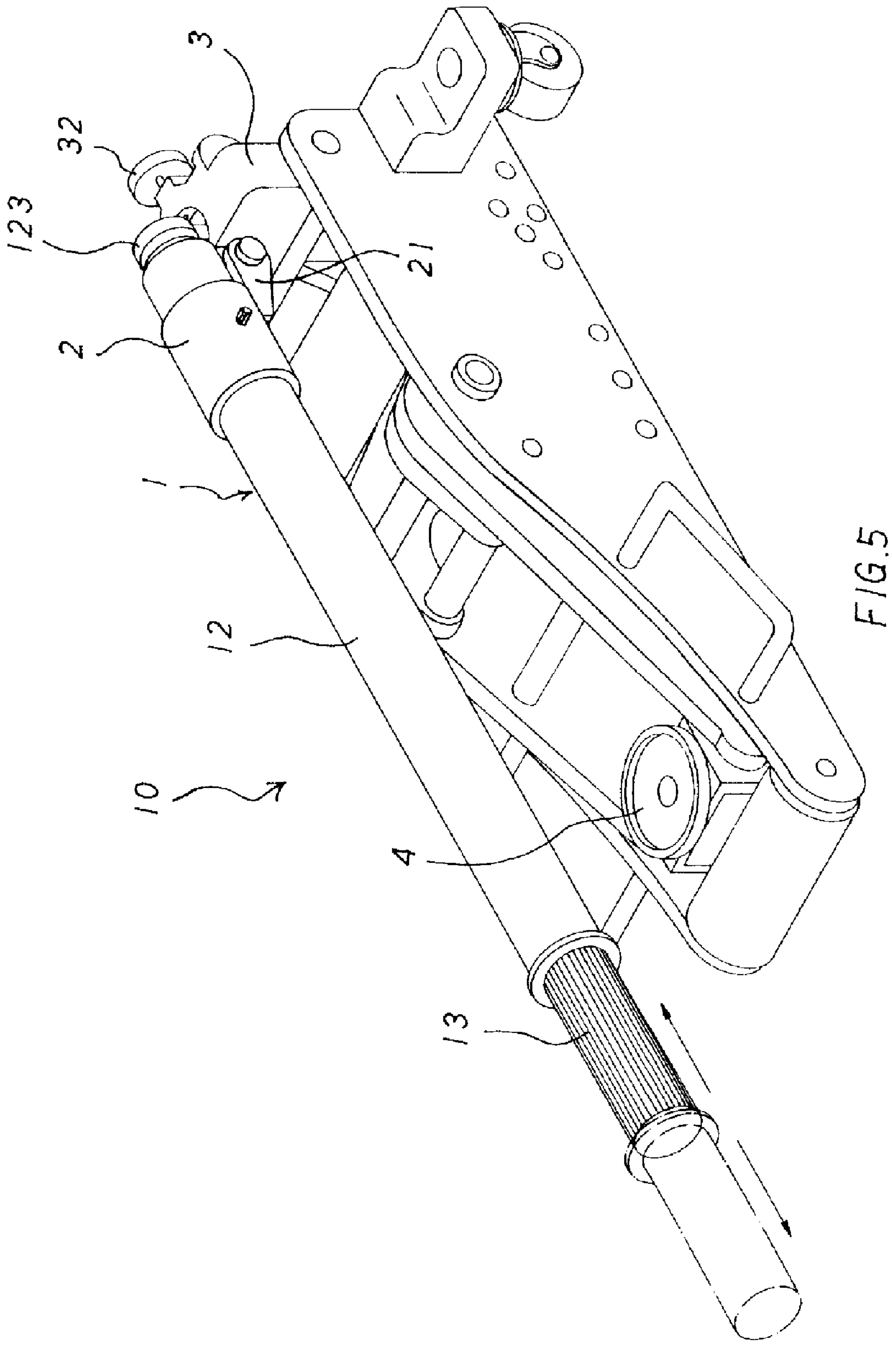
FIG. 5 shows a storage state view of the jack in accordance with the prevent invention.

Since the bottom of the inner pipe 11 is disposed in the outer pipe 12, the inner pipe 11 can be pulled upwards through the handle sleeve 13 until the elastic locking-pin 111 is positioned in the concave ring 121 in the top end of the inner surface of the outer pipe 12, and then the elastic locking-pin 111 will be elastically engaged in the locking hole 122. At this moment, by rotating the inner pipe 11, the locking-pin 111 can be moved in the locking hole 122, and thus the handle 1 is stretched, and can swing the base 3 effortlessly by using the elongated handle 1 (as shown in FIG. 4), achieving the objective of saving energy. After the operation, the elastic locking-pin 111 can be pressed inwards to depart from the locking hole 122 and the concave ring 121, so that the inner pipe 11 can retract in the outer pipe 12. However, during the storage of the jack 10, since the base 3 is protruded with the pivot ear 31 on the front end thereof for the pivot connection with the handle seat 2, the handle seat 2 can swing and rotate freely with respect to the base 3. Thereby, the handle 1 located on the handle seat 2 can be turned to a position above a top plate 4 (as shown in FIG. 5), as a result, the jack's 10 volume is reduced effectively for easy storage.

Moreover, when an oil drain valve 5 of the jack 10 is assembled on the base 3 (it is a conventional design of a jack), a knob cover 123 is correspondingly fixed at a bottom of the outer pipe 12 and serves to adjust the oil drain valve 5, after the handle 1 is disassembled from the handle seat 2.

And a locking nut 32 is disposed on the base 3 and located correspondingly to knob cover 123, which serves to fix the handle 1 to the base 3.

While we have shown and described various embodiments in accordance with the present invention, it is clear to those skilled in the art that further embodiments may be made without departing from the scope of the present invention.

What is claimed is:

1. An extensible and turnover handle structure for a jack comprising:

a handle, a handle seat and a base; wherein:

the handle includes an inner pipe inserted into an outer pipe, at a bottom of the inner pipe is located an elastic locking-pin is engaged in a locking hole in a concave ring formed in a top end of an inner surface of the outer pipe;

the handle seat is a seat for receiving and locking the outer pipe, and a pair of ears extends downward from a front surface of a bottom of the handle seat;

the base is a swing member serving to draw hydraulic oil through swing motion and is formed at a front end thereof with a pivot ear;

the two ears of the handle seat are pivotally coupled to the pivot ear of the base, the outer pipe is inserted in the handle seat, and then the inner pipe with a handle sleeve on the top end thereof is inserted in the outer pipe, thus the handle is allow to be turned to a position above a top plate for storage, and when the jack is in use, the inner pipe is allowed to be pulled out of the outer pipe to elongate the handle structure, thus achieving an objective of saving energy.

2. The extensible and turnover handle structure for a jack as claimed in claim 1, wherein an oil drain valve of the jack is assembled on the base, a knob cover is correspondingly fixed at a bottom of the outer pipe and serves to adjust an oil drain valve, after the handle is disassembled from the handle seat.

3. The extensible and turnover handle structure for a jack as claimed in claim 2, a locking nut is disposed on the base and located correspondingly to the knob cover, which serves to fix the handle to the base.

* * * * *